United States Patent [19]

Nelson et al.

[11] Patent Number: 5,508,507
[45] Date of Patent: Apr. 16, 1996

[54] IMAGING SYSTEM EMPLOYING EFFECTIVE ELECTRODE GEOMETRY AND PROCESSING

[75] Inventors: Owen L. Nelson, St. Paul; Frederick R. Kroeger, Jr., Oakdale, both of Minn.

[73] Assignee: Minnesota Mining and Manufacturing Company, St. Paul, Minn.

[21] Appl. No.: 490,748

[22] Filed: Jul. 13, 1995

Related U.S. Application Data

[63] Continuation of Ser. No. 221,687, Mar. 31, 1994, abandoned.

[51] Int. Cl.$^6$ .............................. G01T 1/24; G03G 15/05
[52] U.S. Cl. .............................. 250/214 LA; 250/370.09; 250/315.3; 250/591
[58] Field of Search .................. 250/214 LA, 214 A, 250/214 VT, 214 R, 370.09, 370.08, 370.01, 591, 590, 315.3; 313/531; 378/21, 24, 28, 37

[56] References Cited

U.S. PATENT DOCUMENTS

| | | | |
|---|---|---|---|
| 4,176,275 | 11/1979 | Korn et al. | 250/213 |
| 4,539,591 | 9/1985 | Zermeno et al. | 358/335 |
| 4,711,838 | 12/1987 | Grzeskowiak et al. | 430/568 |
| 4,763,002 | 8/1988 | Zermeno et al. | 250/370.01 |
| 4,778,985 | 10/1988 | Modisette et al. | 250/214 LA |
| 4,818,857 | 4/1989 | Micheron et al. | 250/214 LA |
| 4,833,324 | 5/1989 | Kamieniecki et al. | 250/315.3 |
| 4,857,723 | 8/1989 | Modisette | 250/214 LA |
| 4,873,436 | 10/1989 | Kamieniecki et al. | 250/370.01 |
| 4,961,209 | 10/1990 | Rowlands et al. | 378/29 |
| 5,268,569 | 12/1993 | Nelson et al. | 250/214 LA |
| 5,311,033 | 5/1994 | Disanayaka | 250/591 |
| 5,354,982 | 10/1994 | Nelson et al. | 250/214 LA |

FOREIGN PATENT DOCUMENTS 0292140  11/1988  European Pat. Off. ......... G03G 5/00

OTHER PUBLICATIONS

Rowlands et al., "X–ray Imaging Using Amorphous Selenium: A Photoinduced Discharge Readout Method for Digital Mammography", Med. Phys., 18(3), May/Jun. 1991, pp. 421–431.

*Primary Examiner*—Edward P. Westin
*Assistant Examiner*—John R. Lee
*Attorney, Agent, or Firm*—Gary L. Griswold; Walter N. Kirn; William D. Bauer

[57] ABSTRACT

An imaging system employs a photoconductive material capable of bearing a latent photostatic image, a plurality of elongated parallel electrodes adjacent the photoconductive material, selective scanning of the individual electrodes to produce charge carriers within the photoconductive material, and time-ordered detection of the current created by the charge carriers in the plurality of elongated parallel electrodes. Dynamic rearrangement of the detection pattern for individual electrodes allows for detection from effective electrodes wider than the individual electrodes. Appropriate addressing of the effective electrodes during the scan produces a pixellated representation of the latent image having selectable resolution and reduction of edge-effect artifacts of known systems.

28 Claims, 7 Drawing Sheets

IMAGING SYSTEM EMPLOYING EFFECTIVE ELECTRODE GEOMETRY AND PROCESSING

This is a continuation of application Ser. No. 08/221,687 filed Mar. 31, 1994, now abandoned.

TECHNICAL FIELD

This invention relates to systems for producing images, and especially those systems which use photoconductive materials to absorb radiation to create a latent image, followed by a selective detection of the latent image in the photoconductive material.

BACKGROUND OF THE INVENTION

One type of imaging system employs photoconductive materials to absorb incident radiation representative of an image of an object. Suitable photoconductive materials will absorb the radiation and produce electron-hole pairs (charge carriers) which may be separated from each other by an electric field applied across the photoconductor, creating a latent image at the surface of the photoconductor (which is typically a thin planar layer). A narrow beam of scanning radiation substantially completes discharge of the photoconductor, by creating motion of a second set of charge carriers. The distribution of these second charge carriers in the plane of the photoconductor is affected by the distribution of the first charge carriers, i.e., by the latent image. The motion of the second charge carriers is detected and digitized in an appropriate circuit, and thus the latent image is captured in digital form.

In one specific embodiment, the photoconductor is part of a multilayer structure comprising two electrodes, between which are the photoconductive layer and an insulative layer. A voltage source maintains electric fields in the structure during exposures to the incident radiation and the scanning radiation (although not necessarily the same field strength is present during each exposure). An example of this type of system is taught in U.S. Pat. No. 4,176,275 (Korn et al). Application of the electric field across the photoconductive layer can be assisted by establishing a prior (reverse) field across the insulating layer, as taught in U.S. Pat. No. 4,539,591 (Zermeno et al).

A second and closely related approach, known as the air-gap photoinduced discharge (PID) method, employs air as the insulating layer, and requires that a uniform separation be maintained between the two electrodes, typically by high-precision mechanical or piezoelectric devices. A corona device such as a corotron charges the surface of the photoconductor prior to exposure to radiation, producing an electric field in the material. Thus, the incident radiation partially discharges the surface to produce a latent image, and the read-out signal is induced by the charge motion under the influence of the residual electric field in response to the scanning radiation. Such a system is described in Rowlands et al, Med. Phys. 18(3), May/June 1991 at 421–431.

Various methods for scanning the latent image exist. For example, the method of U.S. Pat. No. 4,961,209 (Rowlands et al) employs a transparent sensor electrode positioned over the photoconductive layer, and a pulsed laser which scans the photoconductive layer through the transparent sensor electrode. By moving the photoconductive layer and the transparent sensor relative to each other, so that the direction of relative motion is transverse to the direction in which the laser scans, a pixel-by-pixel discharge of the latent image charge is created.

Practical applications of these systems have encountered several problems.

First, fabrication of the imaging stack (i.e., the electrodes, insulator, photoconductive material, etc.) requires applying layers of material to each other, typically by constructing two sub-stacks, and then applying them to each other. These procedures can introduce non-uniformities into the thicknesses of the imaging stack.

Second, reflection and scattering of incident radiation can occur at the interfaces between layers, reducing image quality. This problem, and the attempted solutions to it, are compounded by the non-uniformities in thicknesses.

Third, discharge breakdown of the insulative material is possible, especially in the air-gap PID approach, leading to avalanche currents in the system.

Fourth, as the areal size of the imaging stack increases, a requirement of practical applications such as chest x-ray imaging, the capacitance created by the electrode plates increases, reducing the effectiveness of the system. One approach to this last problem is that of U.S. Pat. No. 4,857,723 (Modisette). This approach avoids, rather than solves, the capacitance issue, by employing many small detectors ganged together.

Many of these problems are addressed successfully by the system described in U.S. Pat. No. 5,268,569, Nelson et al, Imaging System Having Optimized Electrode Geometry and Processing. That system employs the electrode closest to the photoconductor as the detection electrode, segmenting this electrode into stripes, and optionally interconnecting several of these (e.g., every thirty-second stripe) to reduce the number of individual detection circuits.

However, in the Nelson et al system image resolution is effectively fixed by the physical size of each individual segmented stripe. Generally, a single stripe supports a single line of resolution of essentially the same width as the stripe width. Thus, the fixed stripe (and thus pixel) size means that higher resolution requires arrays of very narrow, unacceptably difficult-to-form segmented stripes, which then must be arranged over a larger area than is currently possible to accomplish at acceptable manufacturing yields. The problem is especially acute in medical diagnostic applications, which require pixel widths on the order of 20–200 microns, over increasingly larger image areas (e.g., as large as 14 inches (35.6 centimeters) by 17 inches (43.2 centimeters) for abdominal or chest imaging).

A second limitation of the Nelson et al. system is "charge spreading," a lateral motion of the charge carriers (due to space charge and in-transit charge-induced electric field distortion, especially at reduced readout field strengths) that can cause charges released over one stripe to be collected by a neighboring stripe. This causes degradation of image resolution (sharpness of the image) during the readout process. The extent of charge spreading can be approximately 10–20% of the photoconductor thickness, e.g., 50–100 microns in diagnostic x-ray systems.

A third limitation is significant inter-stripe (coplanar) capacitance. For narrow stripes, the coplanar capacitance seen by the detector circuit is large. Excessive capacitance at the input of a detector circuit can cause a significant amount of noise.

It is possible, although not as preferred, for a single narrow stripe of the Nelson et al system to support more than one pixel of the electrostatic image. This can be accomplished by using multiple scans (sub-scans) of an intensity-modulated laser spot having a size smaller than the width of a stripe, and scanning at a higher rate than would normally occur. Each scan involves modulation of the intensity of the smaller spot over a different sub-portion of the stripe. However, the need to modulate the intensity of the laser at precise times to place the pixels with high resolution and accuracy on the narrow stripes, introduces additional, and undesired, system hardware and software requirements.

SUMMARY OF THE INVENTION

The present invention provides a system for producing an image which addresses the problems of 1) fixed pixel size, 2) loss of image resolution from charge spreading to adjacent electrodes, and 3) significant inter-electrode (coplanar) capacitance. Correction of these problems allows the system for producing an image to produce images having a greater resolution determined by laser spot size and maintains high signal strength. The present invention offers variable pixel size from the same imaging device. It also reduces the coplanar capacitance because there can be fewer, wider electrodes. It also removes the charge spreading limitation because by using an effective electrode which is wider than a laser spot-defined pixel and will collect the spread charge.

In one embodiment, the present invention provides a system for acquiring an electronic image consisting of a plurality of pixels, the image being created by exposure to first radiation incident upon an imaging device. An imaging device has, in order, a first conductive layer, an insulative layer, a photoconductive layer, an electrically blocking layer, and a second conductive layer which consists essentially of a segmented array of elongated, conductive, individual electrodes lying in a first direction, each of the individual electrodes being wider than a single one of the plurality of pixels. Electric field means operatively coupled to the imaging device creates an electric field between the first conductive layer and the second conductive layer which allows creation and distribution of charge carriers in the photoconductive layer upon exposure to the first incident radiation resulting in formation of a latent electrostatic image. Scanning means operating in conjunction with the imaging device utilizes a second radiation, in a first time-ordered pattern, incident upon the imaging device at pixel locations corresponding to the plurality of pixels to initiate motion of the charge carriers within the photoconductive layer, the second radiation being scanned in a second direction substantially different from the first direction. Detection means coupled to the individual electrodes of the imaging device senses the motion of the charge carriers resulting from the second radiation and providing information relative thereto. At least some of the individual electrodes are dynamically combined with an adjacent one of the individual electrodes to form effective electrodes. Which of the individual electrodes are combined is a function of the pixel locations of the second radiation.

In another embodiment, the present invention provides a system for acquiring an electronic image consisting of a plurality of pixels arranged in a plurality of rows, the image being created by exposure to first radiation incident upon an imaging device. An imaging device has, in order, a first conductive layer, an insulative layer, a photoconductive layer, an electrically blocking layer, and a second conductive layer which consists essentially of a segmented array of elongated, conductive, individual electrodes lying in a first direction, each of the individual electrodes having a plurality of the plurality of pixels in each of the rows. Electric field means operatively coupled to the imaging device creates an electric field between the first conductive layer and the second conductive layer which separation of charge carriers in the photoconductive layer upon exposure to the first incident radiation resulting in formation of a latent electrostatic image. Scanning means operating in conjunction with the imaging device utilizes a second radiation incident upon the imaging device at pixel locations corresponding to the plurality of pixels to initiate motion of the charge carriers within the photoconductive layer, the second radiation being scanned in a second direction substantially orthogonal to the first direction. Detection means coupled to the individual electrodes of the imaging device for sensing the motion of the charge carriers resulting from the second radiation and providing information relative thereto. At least some of the individual electrodes are dynamically combined with an adjacent one of the individual electrodes to form effective electrodes. Which of the individual electrodes are combined is a function of the pixel locations. The second radiation is scanned in a plurality of sub-scans for at least one of the plurality of rows wherein one of the plurality of pixel locations in each of the effective electrodes is irradiated during each of the sub-scans, the plurality of sub-scans completing scanning the second radiation at all of the plurality of pixel locations.

In another embodiment, the present invention provides a system for acquiring an electronic image consisting of a plurality of pixels, the image being created by exposure to first radiation incident upon an imaging device. An imaging device has in order a first conductive layer, an insulative layer, a photoconductive layer, an electrically blocking layer, and a second conductive layer, with one of the first conductive and the second conductive layer consisting essentially of a segmented array of elongated, conductive individual electrodes lying in a first direction, each of the individual electrodes being wider than a single one of the plurality of pixels. Electric field means operatively coupled to the imaging device creates an electric field between the first conductive layer and the second conductive layer which allows creation and distribution of charge carriers in the photoconductive layer upon exposure to the first incident radiation resulting in formation of a latent electrostatic image. Scanning means operating in conjunction with the imaging device utilizes a second radiation, in a first time-ordered pattern, incident upon the imaging device at pixel locations corresponding to the plurality of pixels to initiate motion of the charge carriers within the photoconductive layer, the second radiation being scanned in a second direction substantially different from the first direction. Detection means coupled to the individual electrodes of the imaging device senses the motion of the charge carriers resulting from the second radiation and providing information relative thereto. At least some of the individual electrodes are dynamically paired with an adjacent one of the individual electrodes to form a wider effective electrode. The adjacent one of the individual electrodes being nearest the pixel location of the second radiation.

In another embodiment, the present invention provides a system for acquiring an electronic image consisting of a plurality of pixels arranged in a plurality of rows, the image being created by exposure to first radiation incident upon an imaging device. An imaging device has in order a first conductive layer, an insulative layer, a photoconductive layer, an electrically blocking layer, and a second conductive layer, with one of the first conductive and the second conductive layer consisting essentially of a segmented array of elongated, conductive individual electrodes lying in a first direction and having a width, each of the individual electrodes having a plurality of the plurality of pixels within the width of the individual electrodes. Electric field means operatively coupled to the imaging device creates an electric field between the first conductive layer and the second conductive layer which allows creation and distribution of charge carriers in the photoconductive layer upon exposure to the first incident radiation resulting in formation of a latent electrostatic image. Scanning means operating in conjunction with the imaging device utilizes a second radiation, in a time-ordered pattern, incident upon the imaging device at pixel locations corresponding to the plurality of pixels to initiate motion of the charge carriers within the photoconductive layer, the second radiation being scanned substantially orthogonal to the first direction. Detection means coupled to the individual electrodes of the imaging device senses the motion of the charge carriers resulting from the second radiation and providing information relative thereto. The scanning means sequentially scans the second radiation in a plurality of sub-scans for each of the plurality of rows wherein one of the pixel locations of one of alternate ones of the plurality of individual electrodes is irradiated during a first one of the sub-scans, wherein subsequent sub-scans irradiate other of the pixel locations of the one of the alternate ones of the plurality of individual electrodes and then irradiate the pixel locations of the other of the alternate ones of the plurality of individual electrodes, such sub-scanning continuing until all of the plurality of pixel locations in each of the plurality of rows are scanned. During each of the plurality of sub-scans, at least some of the alternate ones of the plurality of individual electrodes is paired first with an adjacent one of the individual electrodes nearest the pixel location to form a wider effective electrode, and then the alternate ones of the plurality of individual electrodes being paired with another adjacent one of the individual electrodes nearest the pixel location as the pixel location moves across the image device during each one of the plurality of sub-scans.

In another embodiment, the present invention provides a system for acquiring an electronic image consisting of a plurality of pixels arranged in a plurality of rows, the image being created by exposure to first radiation incident upon an imaging device. An imaging device has, in order, a first conductive layer, an insulative layer, a photoconductive layer, an electrically blocking layer, and a second conductive layer which consists essentially of a segmented array of elongated, conductive, individual electrodes lying in a first direction, each of the individual electrodes having X pixels in each of the rows. Electric field means operatively coupled to the imaging device creates an electric field between the first conductive layer and the second conductive layer which separation of charge carriers in the photoconductive layer upon exposure to the first incident radiation resulting in formation of a latent electrostatic image. Scanning means operating in conjunction with the imaging device utilizes a second radiation incident upon the imaging device at pixel locations corresponding to the plurality of pixels to initiate motion of the charge carriers within the photoconductive layer. The second radiation is scanned in a second direction substantially orthogonal to the first direction. Detection means coupled to the individual electrodes of the imaging device senses the motion of the charge carriers resulting from the second radiation and providing information relative thereto. At least some of the individual electrodes are dynamically combined with Y adjacent ones of the individual electrodes to form effective electrodes. Which of the individual electrodes are combined being a function of the pixel locations. The scanning means scans the second radiation in X times Y sub-scans for at least one of the plurality of rows wherein one of the plurality of pixel locations in each of the effective electrodes is irradiated during each of the sub-scans, the plurality of sub-scans completing scanning the second radiation at all of the plurality of pixel locations.

The use of effective electrodes allows an image pixel density greater than the electrode linear density, i.e., more than one pixel of the electrostatic image is produced in a single physical electrode of the array, as measured in the second direction. Thus, the system has higher resolution than known systems, with easily manufacturable electrode widths. The wider electrodes also significantly reduce the co-planar capacitance seen by the detection circuitry reducing that source of noise. The use of effective electrodes significantly relaxes required pixel registration accuracy.

The present invention provides a system for producing an image which maintains high signal strength, and resolution determined by the laser spot size, while allowing a selection of several pixel sizes from the same imaging device. By dynamically creating effective electrodes of dimension wider than the pixel, it reduces the blurring effects of space-charge-induced signal charge spreading. The pixel size, and hence the readout resolution, can be changed by changing the read-out spot diameter, the translation of scan line rate and the sequencing of the dynamic effective electrodes. Thus the layered stack geometry and readout interconnection protocol can allow selection of imaging characteristics to match the imaging requirements of the various diagnostic applications of the user.

BRIEF DESCRIPTION OF THE DRAWINGS

The foregoing advantages, construction and operation of the present invention will become more readily apparent from the following description and accompanying drawings in which.

DETAILED DESCRIPTION OF THE PREFERRED EMBODIMENTS

Figure 1:
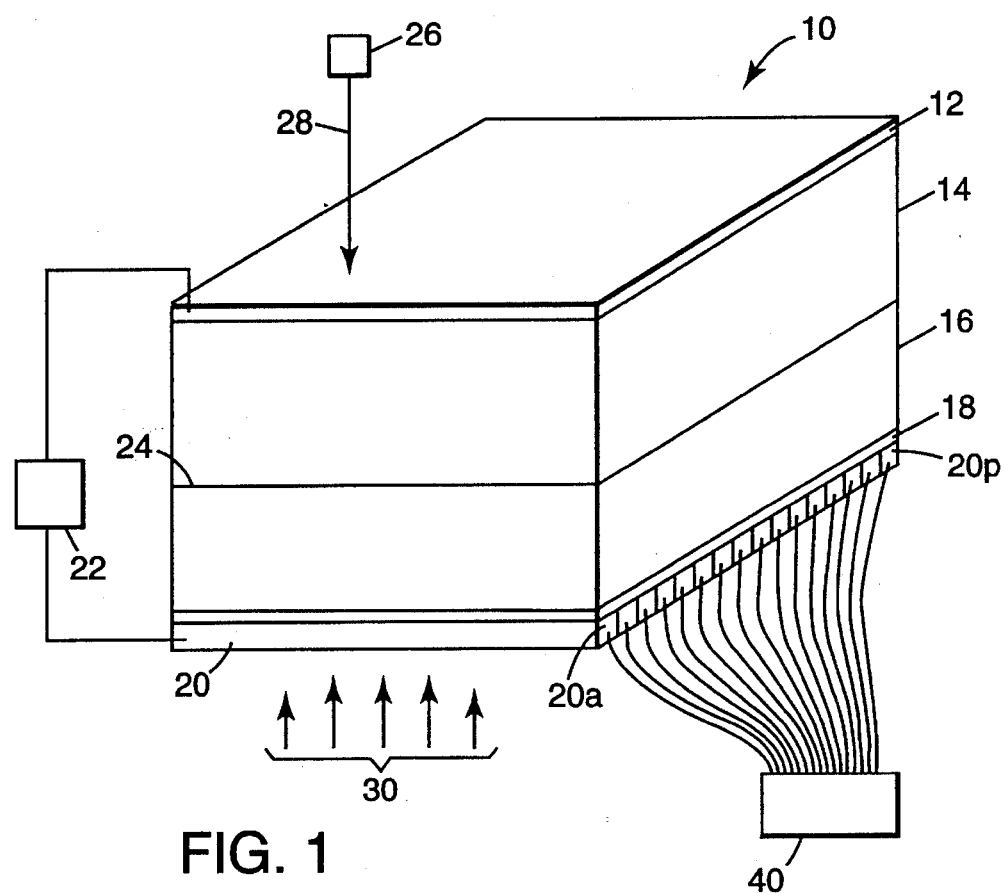
FIG. 1 is a schematic representation of one embodiment of the invention.

The basic construction of an imaging device 10 used in a preferred embodiment of the invention is illustrated schematically in FIG. 1. The imaging device 10 comprises a layered stack having a first conductive layer 12, an insulative layer 14, a photoconductive layer 16, an electrically blocking layer 18, and a second conductive layer 20, in that order (top to bottom as shown in FIG. 1). The second conductive layer 20 comprises a segmented array of conductive electrodes, 20a–20p in the sixteen channel embodiment shown (other numbers of channels are possible).

Although the preferred basic construction of imaging device 10 is as described above, it is recognized that the two electrode layers, 12 and 20, could be essentially interchanged. That is, first conductive layer 12 could be physically located below photoconductive layer 16 and second conductive layer 20 having a segmented array of conductive electrodes 20a–20p could be located on top of insulative layer 14.

Although not shown for clarity, in an actual construction a support for the layered stack, such as a supporting transparent substrate and/or a mechanical frame of some type, would generally be used. The layered stack may be built up on the substrate from individual components, and then placed in the frame. However, with a suitable choice of materials, the layered stack may not require a substrate or a mechanical frame, and thus the invention is not so limited as to require their use.

Many materials are suitable for each of the layers of the stack, subject to considerations of electrical properties and transparency discussed below. Generally, the substrate, if used, may be any material providing mechanical support, dimensional stability, and low electrical conductivity. For example, glass having a thickness of approximately 2 to 4 millimeters is a suitable substrate upon which segmented array 20a–20p of second conductive layer 20 may be created by depositing a planar conductive sheet and then etching away undesired material.

The preferred material for photoconductive layer 16 is amorphous selenium, which may be incorporated into the layered stack in a conventional manner. Lead oxide, cadmium sulfide, and mercurous iodide, among other materials, are suitable, as are organic photoconductors. In general, photoconductive layer 16 will have low conductivity in the absence of radiation so that an electric field may be maintained across it for a sufficient period of time, such as a resistivity of about $10^9$ ohm-centimeters or greater.

The thickness of photoconductive layer 16 should be sufficient to allow it to absorb about 50 percent or more of the flux of incident radiation (described below). For amorphous selenium and diagnostic x-ray radiation, for example, this thickness is approximately 250–550 micrometers.

Insulative layer 14 may be a fluid material (including a gaseous material such as air) at the operating temperature of imaging device 10, or a layer of material which is non-fluid at the operating temperature of the imaging device 10.

The insulative layer 14 is typically 100 to 300 microns thick. The insulative layer 14 may be created through the use of vapor-deposited polymeric materials such as poly-p-xylene or Union Carbide "Parylene-C," a technique that is preferred for its ability to create a uniformly thick layer, although this ability is adversely affected somewhat when the material is deposited from a point source. Alternatively, first conductive layer 12 may be separately deposited upon a flexible insulative layer 14, such as a layer of gold evaporated onto a polymeric film, and that product added to the stack by use of an optical adhesive, typically 1 to 30 microns thick.

Imaging device 10 can be utilized in a system 38 for producing an image created by incident radiation 30 as illustrated in FIG. 1. An electric field is first created between first conductive layer 12 and second conductive layer 20. Imaging device 10 is then exposed to first incident radiation 30 creating a latent image within imaging device 10. The system then "reads" imaging device 10 containing the latent image by scanning imaging device 10 with a first time ordered pattern of second incident radiation ("scanning radiation") to initiate a readout of the latent image. Detection electronics, coupled to imaging device 10 detect current flow within imaging device 10 resulting in the capture of an electronic digital representation of the latent image.

Voltage source 22 creates an electric field between first conductive layer 12 and second conductive layer 20, such that electron-hole pairs created in photoconductive layer 16 by first incident radiation 30 are separated in imaging device 10. An electric field of 5 to 20 volts/micron is typical. Field strengths in the higher end of this range improve the carrier separation efficiency of imaging device 10. Generally, but not necessarily, when amorphous selenium is used, a positive polarity is used on electrode 12. For this polarity, electrically blocking layer 18 is chosen to suppress the injection of negative charges from electrode 20 into photoconductive layer 16. The same relative polarity is used in the operation of imaging device 10 during exposure and reading, but this is also not necessary if appropriate adjustments are made. For example, first electrode 12 may be biased negatively with respect to second electrode 20 while photoconductive layer 16 is exposed to uniform radiation, thereby creating a uniform charge density at interface 24 between photoconductive layer 16 and insulative layer 14. Thus the electric field across insulative layer 14 is much higher than that across photoconductive layer 16. During the exposure to first incident radiation, voltage source 22 is adjusted so that the voltage across insulative layer 14 is shared with photoconductive layer 16, e.g., by using a voltage source value of zero.

The first incident radiation leaves a latent image in an image-wise pattern in imaging device 10 by creating charge carriers within photoconductive layer 16. The charge carriers separate under the influence of the electric field created by voltage source 22. This creates a first current within imaging device 10, reducing the electric field in an image-wise pattern, resulting in the formation of a latent electrostatic image at interface 24 between insulative layer 14 and photoconductive layer 16. To keep the latent image from dissipating, the electric field across imaging device 10 is maintained but may be reduced to approximately 1 to 5 volts/micron. Voltage source 22 may then be disconnected and the relatively slow dark decay rate of photoconductive layer 16 may be relied upon to maintain the electric field.

The image of interest is in the form of a pattern of incident radiation 30, which is incident upon imaging device 10 from either side. In FIG. 1, incident radiation 30 is incident from the direction of second conductive layer 20, but this is illustrative only. In this embodiment, array of electrodes 20a–20p and electrically blocking layer 18 must be semi-transparent at the wavelength of incident radiation 30. A preferred embodiment of the invention is designed for use with incident radiation 30 in the form of x-rays (wavelength $10^{-8}$ to $10^{-11}$ meters), for which thin metallic, e.g., aluminum, layers are sufficiently semi-transparent.

In the readout phase of operation of system 38, a third electric field strength is maintained across layered stack of imaging device 10, typically 1 to 5 volts/micron. Scanner 26, in a first time-ordered pattern, utilizes scanning radiation 28 to energize imaging device 10 to produce a second current, comprising mobile charge carriers, within the imaging device 10.

Scanning radiation 28 may have a wavelength substantially similar to that of the first incident radiation, or a substantially different wavelength. Scanning radiation 28 may be ultraviolet, visible, or infrared radiation, as appropriate for the specific choice of photoconductive layer 16.

Generally, the first time-ordered pattern in combination with a translation of imaging device 10 in a direction substantially orthogonal to the first time-ordered pattern, will ensure that the entire surface of the layered stack of imaging device 10 holding the latent image is scanned, since until the scan is performed the location of the image on the surface is not known. For most efficient operation at highest resolution, any point on the surface is scanned only once, and no points are missed. A preferred pattern is a series of parallel lines in which the scanning proceeds in the same direction in each line. The spacing between parallel scan lines is determined by the translation of imaging device 10 during the time between the start of successive scans. Such a pattern can be oriented at angles up to 45 degrees to the longitudinal direction of array of conductive electrodes 20a–20p, but preferably is oriented perpendicular to the longitudinal direction of array of conductive electrodes 20a–20p. Alternatively, a two-dimensional scanning mechanism (well known in the art) could be used in place of the one-dimensional scan coupled with a translation of imaging device 10 as discussed here.

Scanning radiation 28 is absorbed in photoconductive layer 16. Scanner 26 provides radiation which is modulated to be active for each and every pixel of the image. Scanner 26 provides radiation which is of constant intensity when active for each pixel. Generally scanning radiation 28 is in the visible wavelength range. The wavelength is determined by the energy required to excite charge carriers in photoconductive layer 16. For a photoconductive layer 16 constructed of amorphous selenium, a blue-green laser is appropriate.

A laser is preferred for its focusing and intensity properties, but is not preferred for its coherence. The use of a coherent light source with insulative layer 14 having a non-zero thickness can produce interference effects. These may be minimized by reducing the reflection of the scanning radiation from the surfaces of insulative layer 14, such as through the use of anti-reflection coatings on one or both sides of insulative layer 14. Methods of accomplishing this have been taught in many sources, including U.S. Pat. No. 4,711,838, Grezskowiak et al, and U.S. Pat. No. 5,311,033, Disanayaka, assigned to the assignee of the present application, both of which are hereby incorporated by reference.

Figure 2:
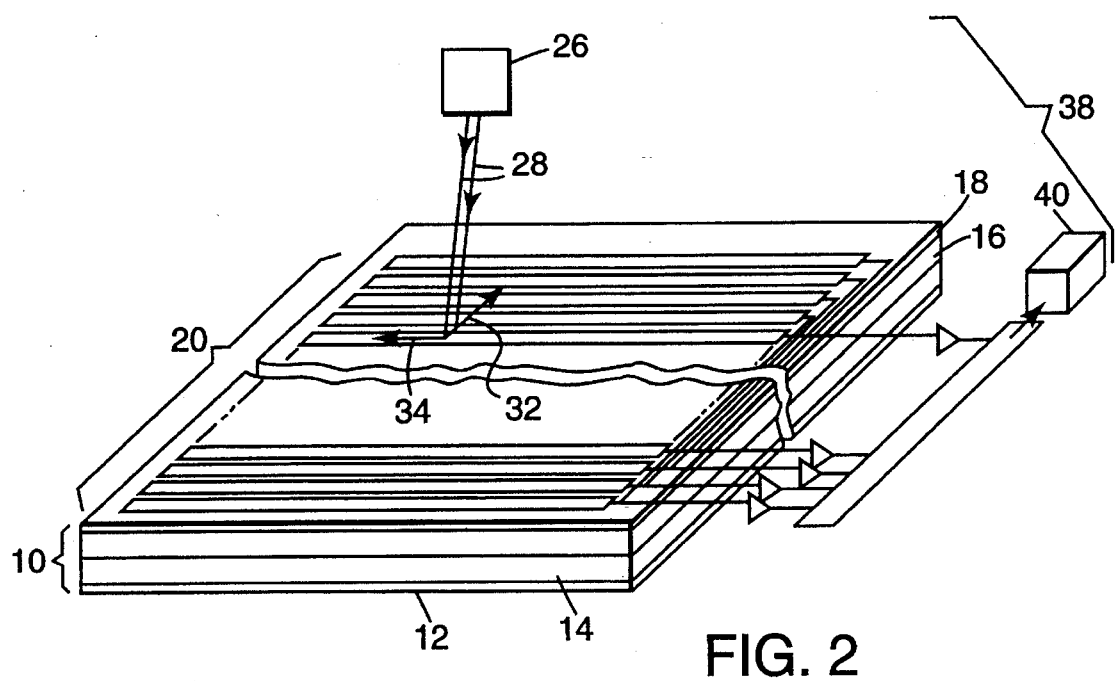
FIG. 2 is a schematic representation of another embodiment of the invention.

In the embodiment shown in FIG. 1, scanning radiation 28 energizes the layered stack of imaging device 10 by passing through first conductive layer 12 and insulative layer 14 prior to absorption. This is illustrative only, as scanning radiation 28 could also energize the layered stack of imaging device 10 by passing through second conductive layer 20 and electrically blocking layer 18 prior to absorption, as shown in FIG. 2. In either case, conductive layer (12 or 20) through which scanning radiation 28 passes must be semi-transparent at the wavelength of scanning radiation 28, e.g., the wavelengths on the order of several hundred nanometers that are typical of visible lasers. Generally, either conductive layer (12 or 20) will be semi-transparent due to a metallic construction at a small thickness, e.g, gold, or a non-metallic construction at a greater thickness, e.g., indium tin oxide of 0.1 to 0.5 microns thickness. Electrically blocking layer 18 may also be semi-transparent and is typically 0.01 to 0.1 microns thick. Insulative layer 14 may be transparent due to its polymeric composition, e.g, of polyester or polycarbonate. Also, if a substrate is present and radiation passes through it, it must be substantially transparent at the wavelengths involved.

As indicated in FIG. 2, array of conductive electrodes 20a–20p is a plurality of elongated parallel electrodes. The longitudinal direction of array of conductive electrodes 20a–20p must be substantially different from the direction of the scan performed by scanner 26, i.e., scanner 26 scans the array in a "vertical" direction, indicated by arrow 32, and array of conductive electrodes 20a–20p lie in a "horizontal" direction indicated by arrow 34. Thus, as shown, the directions 32 and 34 are perpendicular to each other, but other substantially different directions are possible with appropriate modifications to detection electronics 40.

The latent image is captured by detection electronics 40, which is attached to array of conductive electrodes 20a–20p, and is sensitive to motion of the charge carriers set in motion by scanning radiation 28. Approximately 1 to 50 microseconds may be required for the charge carriers to traverse photoconductive layer 16. For each one of array of conductive electrodes 20a–20p, the change in induced charge is detected and amplified to produce a signal indicative of the capture of that part of the latent image.

The sensitivity of the detection electronics 40 is timed to the members of array of conductive electrodes 20a–20p in a second, time-ordered pattern. A single one of array of conductive electrodes 20a–20p is made more sensitive than adjacent ones of array of conductive electrodes 20a–20p by holding the adjacent electrodes at virtual ground level (not necessarily absolute ground level) relative to the single electrode between them, and by triggering an integrator circuit to begin collecting charge on that single electrode. For example, given the parallel lines of the first time-ordered pattern mentioned above, the second time-ordered pattern would follow the "direction" of sensitivity, i.e., the location of the most sensitive electrode as a function of time would appear to move repeatedly across the layered stack of imaging device 10 in the same direction as each pass of the scanning radiation 28. This apparent motion would be synchronized with the scanning pattern.

Thus, by appropriate coordination of the first and second time-ordered patterns, the detection electronics 40 interprets a coincidence of the first and second patterns as a pixel of the image produced by incident radiation 30. This is contrary to the known practice of scanning a striped electrode in this type of system with a single line-shaped pattern, and coordinating the electronics to read all electrodes simultaneously in a parallel fashion, as taught in U.S. Pat. No. 4,176,275, Korn et al, in column 6 at lines 18–36.

FIG. 2 shows an example of how the array of striped electrodes 20a–20p could be attached to the detection electronics 40 to reduce the number of amplifier circuits 50 required, although other techniques are possible. For convenience of illustration, only nine electrodes are shown in FIG. 2: the first through fourth, inclusive; the Nth; and the N+1st to N+4th, inclusive (where N is an integer substantially greater than one). Each such set of N adjacent individual electrodes comprises a group. Beginning with the first electrode, every Nth next electrode is electrically tied together, i.e., the first and the N+1st are tied together, as are the second and the N+2nd electrodes, the third and the N+3rd electrode, and so on. Thus, N channels may be created from M electrodes, where M is greater than N, but only N circuits are required, although, of course, up to M circuits could be used. Furthermore, each channel is connected to one individual electrode in each group.

Figure 6:
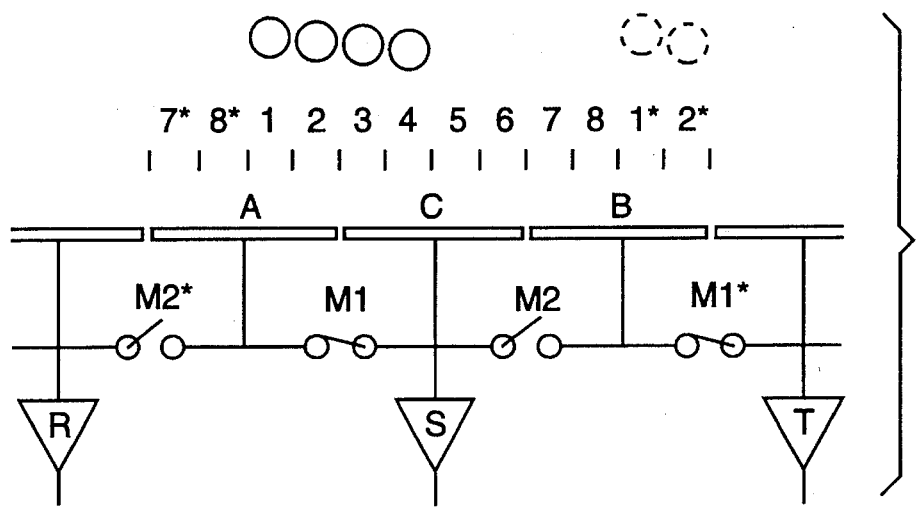
FIG. 6 is a diagrammatic illustration of a preferred embodiment of an apparatus for producing an image in accordance with the present invention showing a first effective electrode connection.

While not shown in FIG. 2 for clarity, adjacent electrodes may be connected to an amplifier circuit 50 with switches as shown in FIG. 6 to form wider effective electrodes. Also, array of conductive electrodes 20a–20p may also contain a start-of-scan and/or an end-of-scan electrode at opposite ends of the array, each of which may have a dedicated amplifier circuit 50 if desired. This allows the electronics to identify positively if scanning radiation 28 is at either of these positions in the array, and thus synchronize detection circuitry 40 for each scanned line. Synchronization may also accomplished by means external to the array.

Figure 3:
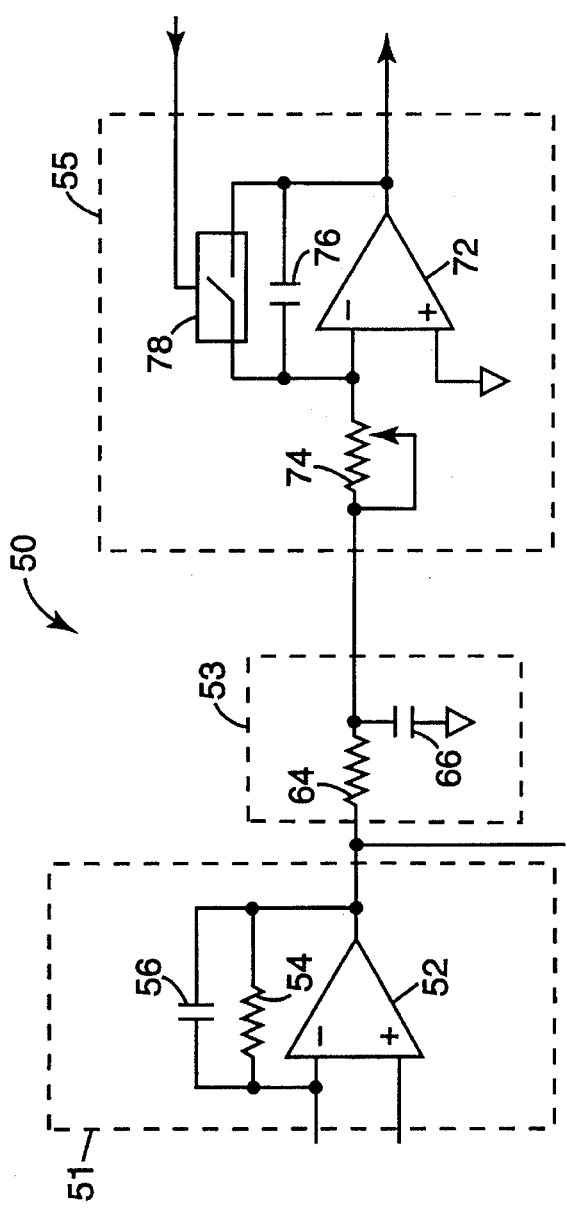
FIG. 3 is an electrical schematic diagram of a preferred amplifier for use with the invention.

FIG. 3 shows an electrical diagram of circuit 50 for each of N channels. Circuit 50 is comprised of three combinations 51, 53, and 55 of circuit elements. First combination circuit 51 includes operational amplifier 52, which can be Burr-Brown OPA637, and feedback resistor 54, which can be $1 \times 10^7$ ohms, connected in parallel with compensation capacitor 56, which can be 70 femto-farads. This combination of elements 51 serves as a trans-impedance amplifier which results in a conversion of current pulses into a corresponding voltage pulse.

Second combination circuit 53 acts as a low-pass filter and includes resistor 64 and capacitor 66. This low-pass filter should be designed so that the response rolls off at a desired frequency. Second combination circuit 53 need not be included in the circuit 50. Second combination circuit 53 may be replaced by or used in combination with a second amplifier stage.

Third combination circuit 55 includes operational amplifier 72, such as Burr-Brown OPA627, capacitor 76, such as 0.001 microfarad, variable input resistor 74, having a resistance of 0–20 kilo-ohms, and remotely-controlled switch 78, such as Siliconix VN0300M N-channel enhancement FET. Third combination circuit 55 functions as a switched integrator controlled by an external signal. Resistor 74 is adjusted to give the desired integrator response in volts per coulomb of charge input to amplifier 52 from one of electrodes 20a–20p. The voltage output of the integrator of circuit 55 can be sampled by an analog multiplexer that is controlled by an external signal. Conventional timing circuitry and control software may then be employed to digitally store the sampled pixel values for further processing.

The scanned image may be processed in many ways. Each pixel of image is represented as a (preferably at least 12-bit) number indicating the intensity of the image. A single line of the image may be handled as a single block of data. If not done so already, interference effects due to a non-zero thickness insulating layer and a coherent light source should be removed from the image, preferably through digital image enhancement techniques. Preferably, a "windowing" technique produces an 8-bit value from the 12-bit value to enhance the contrast of the image prior to display on a monitor or hard copy device.

Figure 4:
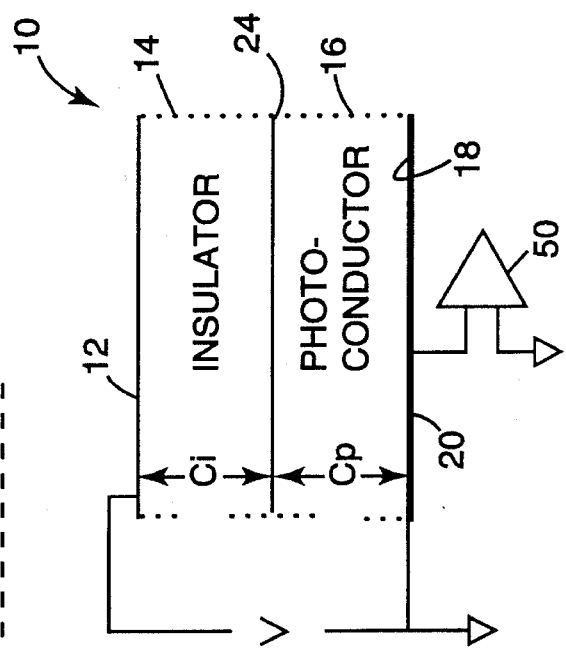
FIG. 4 is a simplified diagrammatic cross-sectional view of an imaging device of the present invention.

A simplified diagrammatic illustration of the construction of layered stack 10 is shown in FIG. 4. Insulative layer 14 and photoconductive layer 16 have capacitances Ci and Cp, respectively. Voltage source 22 is applied to layered stack 10 during the exposure and during the readout. For the case of a photoconductive layer 16 constructed of selenium, where the mobile carriers are the holes, first conductive layer 12 would be biased positive with respect to second conductive layer 20. Blocking layer 18 between photoconductive layer 16 and second conductive layer 20 must be electrically blocking (to the less mobile carriers) so that the applied electric field is maintained across both insulative layer 14 and photoconductive layer 16 prior to imaging. A first incident radiation, e.g., X-ray exposure, creates electron-hole pairs in photoconductive layer 16 which move in the field to cause some fraction, f, of the original negative charge Qo on second conductive layer 20 to reside at interface 24 in an image-wise fashion. The externally supplied voltage simultaneously redistributes charge between first conductive layer 12 and second conductive layer 20 via the external circuit in such a way as to keep the potential difference between these two layers constant.

Readout of the latent image is accomplished by directing a small (pixel-size) beam of scanning radiation, e.g., a laser, onto photoconductive layer 16 to substantially complete the discharge of photoconductive layer 16. This radiation can be incident on photoconductive layer 16 either from above (through insulative layer 14) or from below. During this light readout, the light exposure creates more electron-hole pairs which separate and move to second conductive layer 20 or interface 24. This leads to further redistribution of charge between first conductive layer 12 and second conductive layer 20 by the externally supplied voltage. It is this change in the charge on the electrodes of second conductive layer 20 which is detected by the amplifier circuit 50.

If a pulse of scanning radiation 28 has a duration small compared to the carrier (hole) transit time through photoconductive layer 16 and is of sufficient intensity, the exposure creates enough electron-hole pairs to reduce the local electric field to zero, corresponding to movement of all of the charge which was previously on second conductive layer 20 to interface 24. The external integrated current signal is $$S(f)=Qo[1-f/(1+Ci/Cp)]/(1+Cp/Ci)$$

where Ci, Cp, Qo and f are, respectively, the capacitances per unit area of insulative layer 14 and photoconductive layer 16, the magnitude of the charge originally located on a pixel area of either first conductive electrode 12 or second conductive electrode 20, and the fraction of this charge which was moved to interface 24 by first incident radiation. The contrast (signal difference between first incident radiation-exposed and unexposed regions) is $$DS(f)=Si(0)-Si(f)=Qo*f/(1+Ci/Cp)(1+Cp/Ci)$$

The contrast function is maximized when Ci=Cp, leading to $$DSmax(f)=Qo*f/4.$$

To illustrate the electrostatic induced charge change on an electrode, consider a charge detection amplifier attached to only a narrow electrode, of width comparable to the pixel size, located immediately below a point charge at interface 24. Very little of the induced charge on second conductive layer 20 will be located on one electrode because of the small solid angle it subtends. However, as the point charge approaches the electrode, increasingly more of the induced negative charge will be localized onto this electrode as it flows in from the power supply and adjoining areas of second conductive electrode 20. The change in the induced charge on this electrode, relative to neighboring electrodes, will be quite large.

Figure 5:
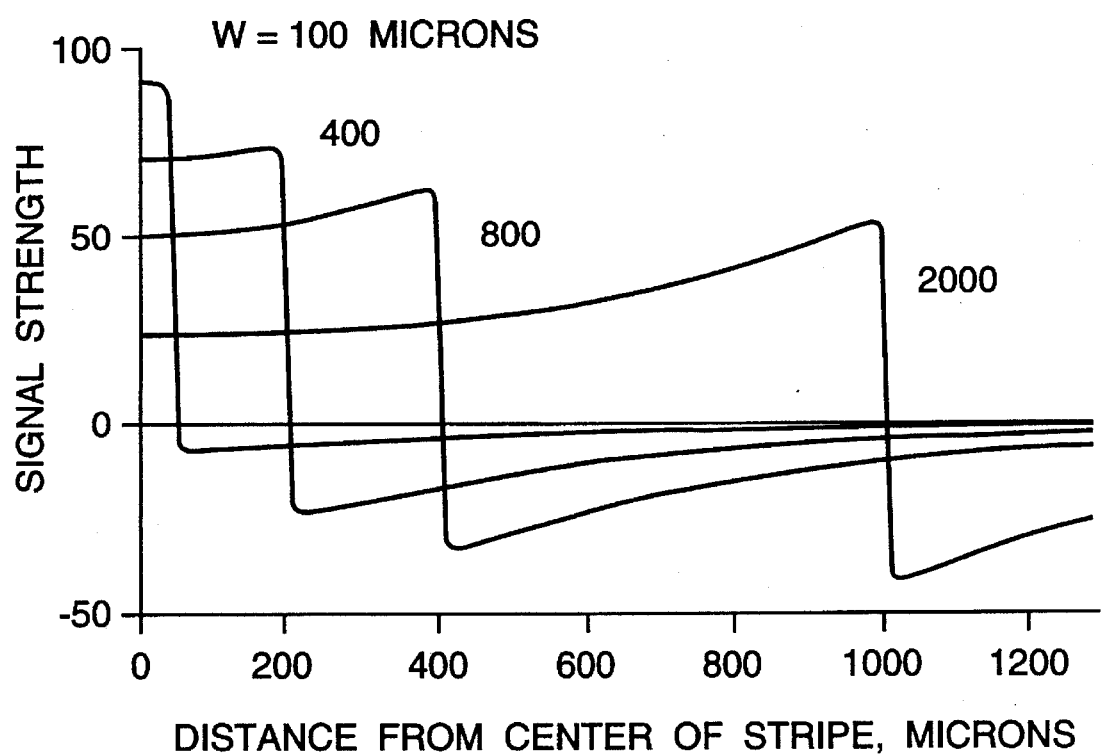
FIG. 5 graphically illustrates how the signal on an electrode varies as the (vertical) path of the released charge is displaced horizontally from the center of an electrode out past the edge of the individual electrode.

FIG. 5 graphically illustrates how the signal on a electrode varies as the (vertical) path of the released charge is displaced horizontally from the center of an electrode out past the edge, for electrodes widths of 100, 400, 800 and 2000 microns. The interface 24 is located 400 microns above the lower plane. For the 100 micron electrode, about 90% of the available signal (100 units here) appears on the electrode when the charge is located above the center of the electrode, and the signal remains at this level until the path of the released charge is near the very edge of the electrode. This suggests that, not only will the signal strength be high, but the image fidelity will be quite high as well. For the widest electrode, on the other hand, the signal is diminished for charges starting near the center of the electrode (about 25% as DSmax predicts). Because the wide electrode subtends a larger solid angle, the induced charge on this electrode will not vary as much as the released charge moves from the interface 24 to the electrode. Only near the edge of the electrode will the signal become appreciably enhanced.

If the electrodes are a few pixels wide, e.g., the effective electrodes taught herein, we see from FIG. 5 that the signal would still be appreciably enhanced. If the readout exposure were pulsed over these electrodes to 'place' the pixels, then an electrode which is, for example, 800 microns wide could be used for collecting an image using pixels of, for example, 100, 160, 50 microns, etc., by sub-scanning 8, 5, 16 times respectively while pulsing at appropriately shifted locations. Thus a layered stack 10 construction and readout method which supports variable pixel size is provided, only requiring changes to the read-out exposure spot size and the pulse timing.

A preferred configuration of segmented second conductive electrode 20 and readout method is diagrammatically illustrated beginning with FIG. 6. In FIG. 6, the physical stripes of segmented second conductive electrode 20 are half as wide as an effective electrode. As layered stack 10 is scanned with scanning radiation 28, adjacent electrode signals are connected to a single amplifier circuit 50. In order to minimize electrode edge effects, the electrodes which are connected together are changed as the scan progresses. This creates an effective electrode width consisting, sometimes, of more than one individual electrode. Using this technique, the scanning radiation 28 from the laser source is always placed in a center area of each effective electrode.

Figure 7:
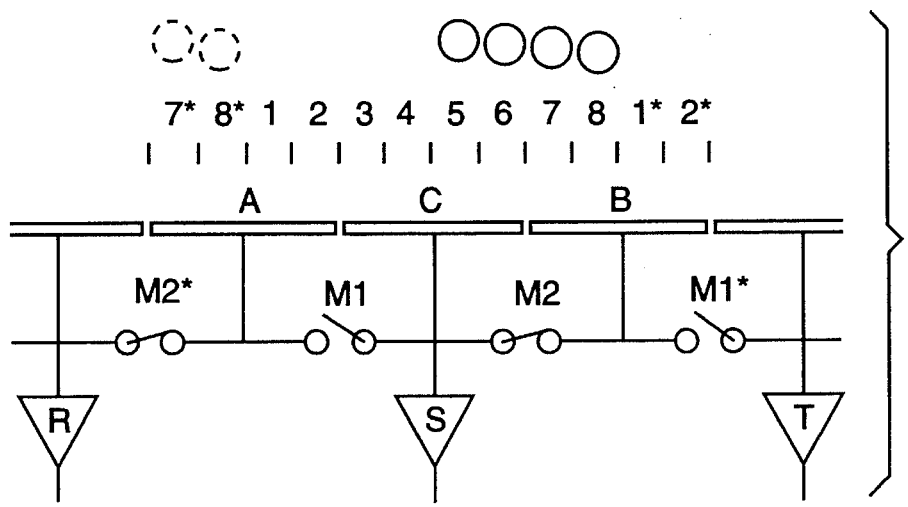
FIG. 7 is a diagrammatic illustration of a preferred embodiment of an apparatus for producing an image in accordance with the present invention showing a second effective electrode connection.

FIG. 6 shows an example with electrodes and pixel placement for analog signal switching and eight pixel scans. Starting the sub-scan count near the center of electrode A, four scanned pixels are placed between the centers of electrodes A and C while electrodes A and C are both connected to the same signal circuit S (one of amplifier circuits 50) by switch M1. This produces an effective electrode consisting of both electrodes A and C which has an effective width of A+C. Between the fourth and fifth pixel scan, the electrodes are re-connected (as shown now by FIG. 7) by switches M1 and M2 so that electrodes C and B are connected to the same amplifier circuit S. The pixel scan then continues, placing pixels 5, 6, 7, 8 between the centers of electrodes C and B. During this time of eight sub-scans, layered stack 10 has translated (with respect to the scan path) one pixel width, and the above cycle is repeated after electrodes A and C are again connected to circuit S.

Figure 8:
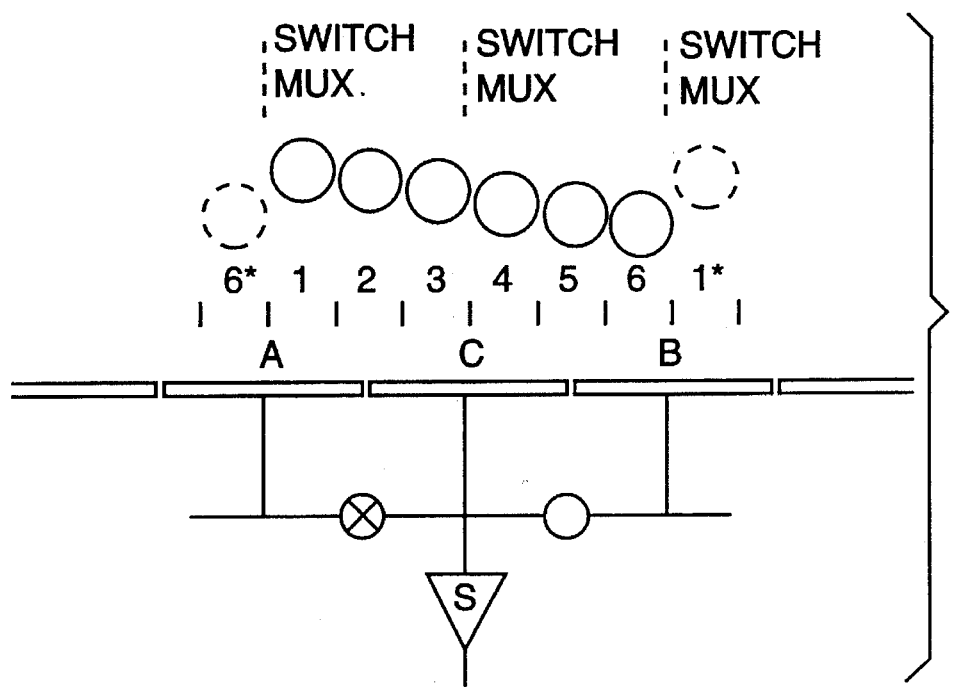
FIG. 8 is a diagrammatic illustration of an alternative embodiment of an apparatus for producing an image in accordance with the present invention showing an effective electrode connection for larger pixels.
Figure 9:
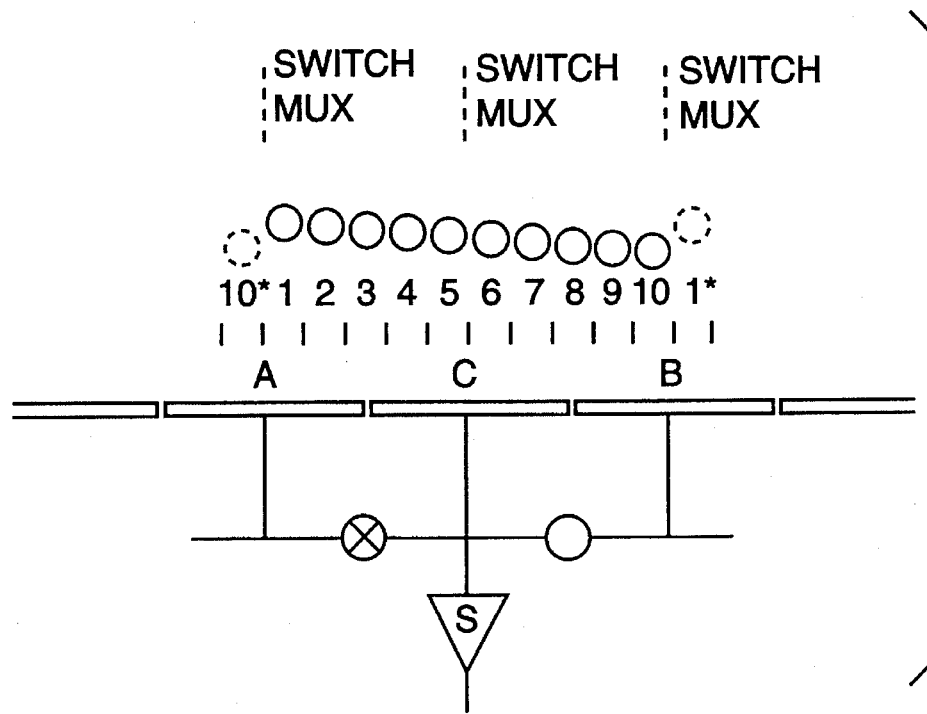
FIG. 9 is a diagrammatic illustration of an alternative embodiment of an apparatus for producing an image in accordance with the present invention showing an effective electrode connection for smaller pixels.

If it were desired to use a different size pixel, the same layered stack 10 with electrodes A, B, C, etc. could be used by simply changing the read-out pulse pixel scan sequence and timing. For example, FIGS. 8 and 9 show positioning for larger and smaller pixels, respectively. For convenience, the number of pixels which fit across the connected electrodes is preferably an integer.

While this 'sequential switching' technique has been illustrated for clarity by using analog switches directly connecting two electrode electrodes, the switching can be done at several points in the pixel data collection path, and more than two electrodes may be included. For example an amplifier circuit 50 could be connected to each electrode, and the switching could be done at the amplifier circuit 52 outputs (or after circuit 53) to sum at a common integrator. Alternately, separate integrator outputs could be added at a common analog-digital converter, or separate digital values from individual converters could be 'switched' together by addition at the digital data collection processor. Although it may require more amplifiers (channels), the digital addition approach is preferred because it (1) reduces the complexity of the detection circuitry, (2) stabilizes the input capacitance seen by the amplifier circuit and (3) eliminates analog switching of signals before the integrator. In each case, the pixel scan sequence will be the same, and the pixels will always appear to be collected from the center area of the multiple pixel wide effective electrode. Since the effective electrode is kept centered and wider than a pixel, absolute registration accuracy of the pixel array (with respect to the electrode edges) is relaxed, relative to the requirements using individual electrodes, to allow variations within a electrode half-width. Relative placement accuracy of the set of sub-scan pixels must still be within a small fraction of a pixel width however to avoid variable overlap of pixels.

A layered stack 10 readout apparatus as described above was constructed to demonstrate the invention described herein. Thirty-two trans-impedance amplifier signals were connected to thirty-two analog switches, which could be digitally controlled to connect adjacent signals to one of sixteen integrators. A modulator was placed in the laser optical path to allow the laser exposure to be pulsed, and a 'start-of-scan' signal was created to provide a geometric 'origin'. Control circuitry was added so that the sub-scan sequencing and laser pulse offsets could be accomplished. The translational scan rate was reduced so that the translational scan line would move one pixel width during 16 sub-scan sequence. Layered stack 10 was constructed to have a second conductive layer 20 of two sequential sets of thirty-two aluminum electrodes, each 1300 microns wide with 60 micron gaps (eight 170 micron pixels) prepared on a glass substrate. Connection pads were provided, and a barrier layer 18 was created on electrodes 20. Photoconductive layer 16 (selenium), insulative layer 14, and transparent first conductive layer 12 was then placed over the electrodes. The capacitance presented to each amplifier 50 by a electrode set was approximately 230 picoFarads, compared to about 460 picoFarads for an equivalent area of single-pixel electrode width layered stack 10; an improvement by a factor of two.

Layered stack 10 constructed in this manner was exposed to an X-ray pattern while 6,000 volts was applied between first conductive layer 12 and second conductive layer 20 consisting of the electrode set. Layered stack 10 was then mounted in a readout scanner, with 2,000 volts applied, and the readout was accomplished. The pixel scan sequence used sixteen sub-scans of 32 pulses for each scan-line of image data, with the analog switches alternated after eight sub-scans, to follow the method depicted in FIGS. 6 and 7 (but for eight-pixel wide electrodes).

Figure 10:
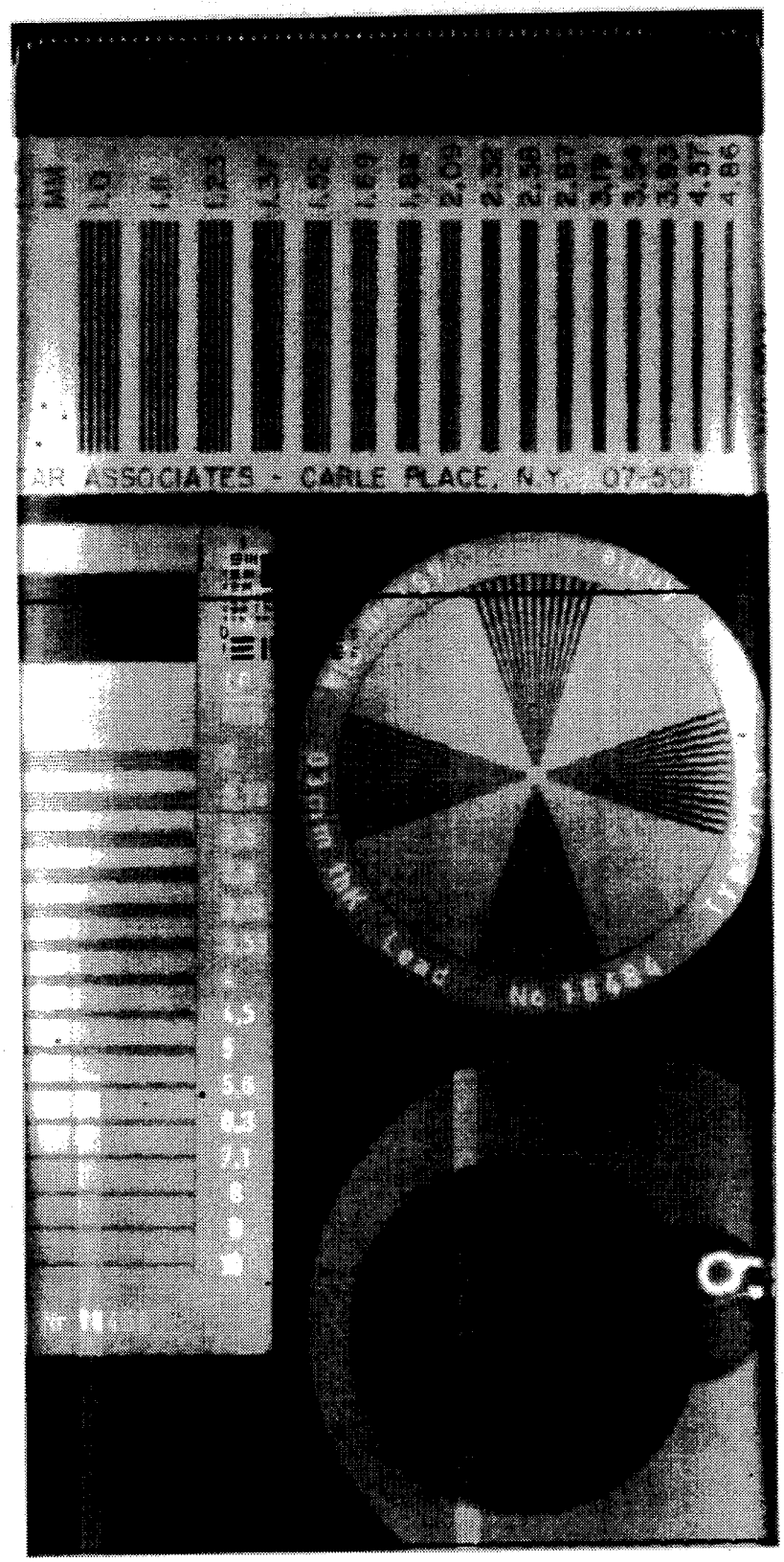
FIG. 10 is an image produced using an apparatus for producing an image in accordance with the present invention.

The resulting image, after the data is re-ordered to place adjacent pixels together, clearly shows the X-ray exposure pattern, with image resolution in both directions of approximately 3 line pairs per millimeter as expected from the pixel size. A copy of a portion of the image is shown in FIG. 10. No artifacts from electrode edges or gap are discernable.

Figure 11:
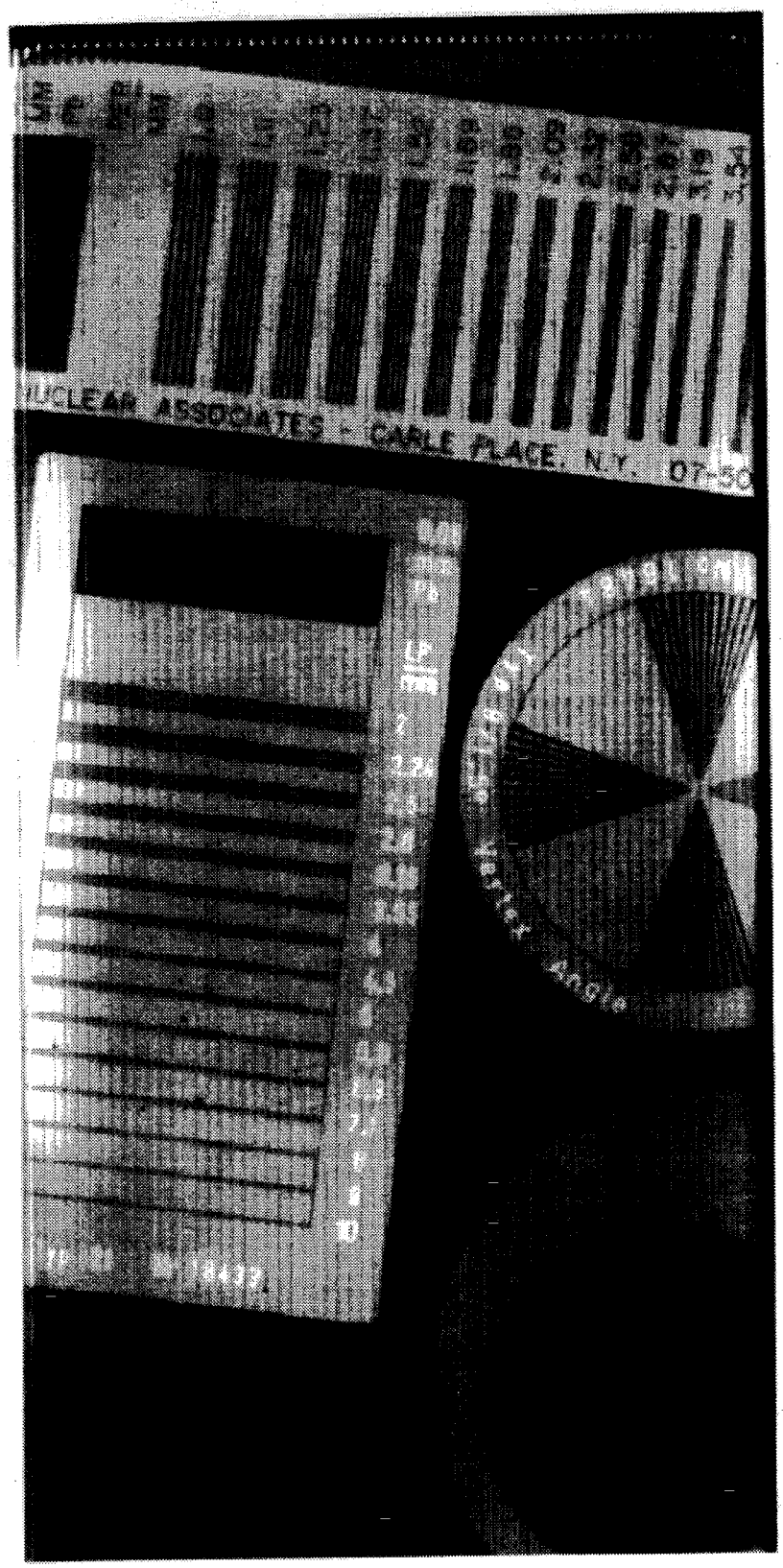
FIG. 11 is an image produced using a prior art method for producing an image.

For comparison, the same layered stack 10 was imaged and scanned using a prior art scanning technique without the use of "effective electrodes" as taught by the present invention. Eight sub-scans of 64 pulses were used for the scan sequence for each image line. A section of a resulting image is shown as FIG. 11, which clearly shows vertical artifacts associated with pixels at the electrode edges and gaps, where all of a pixel's charge is not collected by one individual electrode. Precise pixel placement can reduce but not eliminate these artifacts.

A result equivalent to FIG. 10 was achieved using 32 separate amplifier/integrator circuits and digitally adding the integrator values as suggested above as the preferred approach. Sixteen sub-scans were used and appropriate pairs of digitized integrator values were added to form each image pixel value.

Although the preferred basic construction of imaging device 10 is as described above, it is recognized that the two electrode layers, 12 and 20, could be essentially interchanged. That is, first conductive layer 12 could be physically located below photoconductive layer 16 and second conductive layer 20 having a segmented array of conductive electrodes 20a–20p could be located on top of insulative material 14. Detection electronics would still be connected to individual electrodes of the segmented array of conductive electrodes 20a–20p as before but on "top" of imaging device 10. Effective electrodes consisting of individual electrodes would be made sensitive in the second time-ordered pattern to define pixels in coordination with a first time-ordered pattern of exposure to second incident radiation (scanning radiation). While this arrangement is not preferred, adequate signal and image resolution could be obtained if the effective electrodes were much wider, e.g., ten times wider, than the thickness of photoconductive layer 16 and insulative layer 14. In this non-preferred construction, it is preferred that insulative layer 14 be less thick than is preferred in the basic construction described above.

Thus, it can be seen that there has been shown and described a novel invention as described above. It is to be recognized and understood, however, that various changes, modifications and substitutions in the form and the details of the present invention may be made by those skilled in the art without departing from the scope of the invention as defined by the following claims.

What is claimed is:

1. A system for acquiring an electronic image consisting of a plurality of pixels, said image being created by exposure to first radiation incident upon an imaging device, comprising:

an imaging device having, in order, a first conductive layer, an insulative layer, a photoconductive layer, an electrically blocking layer, and a second conductive layer which consists essentially of a segmented array of elongated, conductive, individual electrodes lying in a first direction, each of said individual electrodes being wider than a single one of said plurality of pixels;

electric field means operatively coupled to said imaging device for creating a first electric field between said first conductive layer and said second conductive layer which allows creation and distribution of charge carriers in said photoconductive layer upon exposure to said first incident radiation resulting in formation of a latent electrostatic image and for creating a second electric field between said first conductive layer and said second conductive layer which allows subsequent image acquisition by scanning;

scanning means operating in conjunction with said imaging device and said electric field means for utilizing a second radiation, in a first time-ordered pattern, incident upon said imaging device at pixel locations corresponding to said plurality of pixels to initiate motion of charge carriers within said photoconductive layer, said second radiation being scanned in a second direction substantially different from said first direction; and detection means coupled to said individual electrodes of said imaging device for sensing said motion of charge carriers resulting from said second radiation and providing information relative thereto;

at least some of said individual electrodes being dynamically combined with an adjacent one of said individual electrodes to form effective electrodes, which of said individual electrodes being combined being a function of said pixel locations of said second radiation.

2. A system as in claim 1 in which said first and second directions are substantially perpendicular to each other.

3. A system as in claim I wherein each one of said individual electrodes is combined with at least one of said adjacent one of said individual electrodes to form one of said effective electrodes, said one of said adjacent one of said individual electrodes being nearest said pixel location of said second radiation.

4. A system as in claim 3 wherein said effective electrodes are formed by electrically interconnecting adjacent ones of said individual electrodes.

5. A system as in claim 3 wherein said effective electrodes are formed by reading data from each individual electrode separately and combining selected ones of said data from said individual electrodes.

6. A system as in claim 1 wherein said system normally operates at an operating temperature and wherein said insulative layer is fluid at said operating temperature.

7. A system as in claim 1 in which said first radiation and said second radiation have substantially different wavelengths.

8. A system for acquiring an electronic image consisting of a plurality of pixels arranged in a plurality of rows, said image being created by exposure to first radiation incident upon an imaging device, comprising:

an imaging device having, in order, a first conductive layer, an insulative layer, a photoconductive layer, an electrically blocking layer, and a second conductive layer which consists essentially of a segmented array of elongated, conductive, individual electrodes lying in a first direction, each of said individual electrodes having a plurality of said plurality of pixels in each of said rows;

electric field means operatively coupled to said imaging device for creating a first electric field between said first conductive layer and said second conductive layer which allows separation of charge carriers in said photoconductive layer upon exposure to said first incident radiation resulting in formation of a latent electrostatic image and for creating a second electric field between said first conductive layer and said second conductive layer which allows subsequent image acquisition by scanning;

scanning means operating in conjunction with said imaging device and said electric field means for utilizing a second radiation incident upon said imaging device at pixel locations corresponding to said plurality of pixels to initiate motion of charge carriers within said photoconductive layer, said second radiation being scanned in a second direction substantially orthogonal to said first direction; and detection means coupled to said individual electrodes of said imaging device for sensing said motion of charge carriers resulting from said second radiation and providing information relative thereto;

at least some of said individual electrodes being dynamically combined with an adjacent one of said individual electrodes to form effective electrodes, which of said individual electrodes being combined being a function of said pixel locations;

said scanning means scanning said second radiation in a plurality of sub-scans for at least one of said plurality of rows wherein one of said plurality of pixel locations in each of said effective electrodes is irradiated during each of said sub-scans, said plurality of sub-scans completing scanning said second radiation at all of said plurality of pixel locations.

9. A system as in claim 8 wherein said effective electrodes are formed by electrically interconnecting adjacent ones of said individual electrodes.

10. A system as in claim 8 wherein said effective electrodes are formed by reading data from each individual electrode separately and combining selected ones of said data from adjacent ones of said individual electrodes.

11. A system as in claim 8 wherein said system normally operates at an operating temperature and wherein said insulative layer is fluid at said operating temperature.

12. A system as in claim 8 in which said first radiation and said second radiation have substantially different wavelengths.

13. A system for acquiring an electronic image consisting of a plurality of pixels, said image being created by exposure to first radiation incident upon an imaging device, comprising:

an imaging device having in order a first conductive layer, an insulative layer, a photoconductive layer, an electrically blocking layer, and a second conductive layer, with one of said first conductive and said second conductive layer consisting essentially of a segmented array of elongated, conductive individual electrodes lying in a first direction, each of said individual electrodes being wider than a single one of said plurality of pixels;

electric field means operatively coupled to said imaging device for creating a first electric field between said first conductive layer and said second conductive layer which allows creation and distribution of charge carriers in said photoconductive layer upon exposure to said first incident radiation resulting in formation of a latent electrostatic image and for creating a second electric field between said first conductive layer and said second conductive layer which allows subsequent image acquisition by scanning;

scanning means operating in conjunction with said imaging device for utilizing a second radiation, in a first time-ordered pattern, incident upon said imaging device at pixel locations corresponding to said plurality of pixels to initiate motion of charge carriers within said photoconductive layer, said second radiation being scanned in a second direction substantially different from said first direction; and detection means coupled to said individual electrodes of said imaging device for sensing said motion of charge carriers resulting from said second radiation and providing information relative thereto;

at least some of said individual electrodes being dynamically paired with an adjacent one of said individual electrodes to form a wider effective electrode, said adjacent one of said individual electrodes being nearest said pixel location of said second radiation.

14. A system as in claim 13 in which said first and second directions are substantially perpendicular to each other.

15. A system as in claim 13 wherein said effective electrodes are formed by electrically interconnecting at least two adjacent ones of said individual electrodes.

16. A system as in claim 13 wherein said effective electrodes are formed by reading said information from each individual electrode separately and combining selected ones of said information from adjacent ones of said individual electrodes.

17. A system as in claim 13 wherein said system normally operates at an operating temperature and wherein said insulative layer is fluid at said operating temperature.

18. A system as in claim 13 in which said first radiation and said second radiation have substantially different wavelengths.

19. A system for acquiring an electronic image consisting of a plurality of pixels arranged in a plurality of rows, said image being created by exposure to first radiation incident upon an imaging device, comprising:

an imaging device having in order a first conductive layer, an insulative layer, a photoconductive layer, an electrically blocking layer, and a second conductive layer, with one of said first conductive and said second conductive layer consisting essentially of a segmented array of elongated, conductive individual electrodes lying in a first direction and having a width, each of said individual electrodes having a plurality of said plurality of pixels within said width of said individual electrodes;

electric field means operatively coupled to said imaging device for creating a first electric field between said first conductive layer and said second conductive layer which allows creation and distribution of charge carriers in said photoconductive layer upon exposure to said first incident radiation resulting in formation of a latent electrostatic image and for creating a second electric field between said first conductive layer and said second conductive layer which allows subsequent image acquisition by scanning;

scanning means operating in conjunction with said imaging device and said electric field means for utilizing a second radiation, in a time-ordered pattern, incident upon said imaging device at pixel locations corresponding to said plurality of pixels to initiate motion of charge carriers within said photoconductive layer, said second radiation being scanned substantially orthogonal to said first direction; and detection means coupled to said individual electrodes of said imaging device for sensing said motion of charge carriers resulting from said second radiation and providing information relative thereto;

said scanning means sequentially scanning said second radiation in a plurality of sub-scans for each of said plurality of rows wherein one of said pixel locations of one of alternate ones of said plurality of individual electrodes is irradiated during a first one of said sub-scans, wherein subsequent sub-scans irradiate other of said pixel locations of said one of said alternate ones of said plurality of individual electrodes and then irradiate said pixel locations of the other of said alternate ones of said plurality of individual electrodes, such sub-scanning continuing until all of said plurality of pixel locations in each of said plurality of rows are scanned;

during each of said plurality of sub-scans, at least some of said alternate ones of said plurality of individual electrodes being paired first with an adjacent one of said individual electrodes nearest said pixel location to form a wider effective electrode, and then said alternate ones of said plurality of individual electrodes being paired with another adjacent one of said individual electrodes nearest said pixel location as said pixel location moves across said image device during each one of said plurality of sub-scans.

20. A system as in claim 19 wherein said effective electrodes are formed by electrically interconnecting at least two adjacent ones of said individual electrodes.

21. A system as in claim 19 wherein said effective electrodes are formed by reading said information from each individual electrode separately and combining selected ones of said information from adjacent ones of said individual electrodes.

22. A system as in claim 19 wherein said system normally operates at an operating temperature and wherein said insulative layer is fluid at said operating temperature.

23. A system as in claim 19 in which said first radiation and said second radiation have substantially different wavelengths.

24. A system for acquiring an electronic image consisting of a plurality of pixels arranged in a plurality of rows, said image being created by exposure to first radiation incident upon an imaging device, comprising:

an imaging device having, in order, a first conductive layer, an insulative layer, a photoconductive layer, an electrically blocking layer, and a second conductive layer which consists essentially of a segmented array of elongated, conductive, individual electrodes lying in a first direction, each of said individual electrodes having X pixels in each of said rows;

electric field means operatively coupled to said imaging device for creating a first electric field between said first conductive layer and said second conductive layer which separation of charge carriers in said photoconductive layer upon exposure to said first incident radiation resulting in formation of a latent electrostatic image and for creating a second electric field between said first conductive layer and said second conductive layer which allows subsequent image acquisition by scanning;

scanning means operating in conjunction with said imaging device and said electric field means for utilizing a second radiation incident upon said imaging device at pixel locations corresponding to said plurality of pixels to initiate motion of charge carriers within said photoconductive layer, said second radiation being scanned in a second direction substantially orthogonal to said first direction; and detection means coupled to said individual electrodes of said imaging device for sensing said motion of charge carriers resulting from said second radiation and providing information relative thereto;

at least some of said individual electrodes being dynamically combined with Y adjacent ones of said individual electrodes to form effective electrodes, which of said individual electrodes being combined being a function of said pixel locations;

said scanning means scanning said second radiation in X times Y sub-scans for at least one of said plurality of rows wherein one of said plurality of pixel locations in each of said effective electrodes is irradiated during each of said sub-scans, said plurality of sub-scans completing scanning said second radiation at all of said plurality of pixel locations.

25. A system as in claim 24 wherein said effective electrodes are formed by electrically interconnecting said individual electrodes.

26. A system as in claim 24 wherein said effective electrodes are formed by reading data from each individual electrode separately and combining selected ones of said data from said individual electrodes.

27. A system as in claim 24 wherein said system normally operates at an operating temperature and wherein said insulative layer is fluid at said operating temperature.

28. A system as in claim 24 in which said first radiation and said second radiation have substantially different wavelengths.

* * * * *